Patented Oct. 2, 1934

1,975,475

UNITED STATES PATENT OFFICE 1,975,475

DESULPHURIZATION OF HYDROCARBON OILS BY HYDROGENATION

Mathias Pier, Heidelberg, and Walter Simon, Ludwigshafen - on - the - Rhine, Germany, assignors, by mesne assignments, to Standard-I. G. Company, Linden, N. J., a corporation of Delaware No Drawing. Application August 8, 1929, Serial No. 384,468. In Germany September 8, 1928

4 Claims. (Cl. 196—24)

This invention is for improvements in or relating to the destructive hydrogenation of carbonaceous materials especially for the production of motor fuels.

A process has already been proposed for purifying crude benzol according to which the product to be purified is treated with hydrogen or gases containing or supplying the same at elevated temperatures and under pressure, if desired under high pressure, in the presence of catalysts, for example, such as are immune against poisoning by sulphur, and in such a manner that alteration of the benzene itself does not occur or only occurs to a small extent.

We have now found that the said process of desulphurizing crude benzol or also of total crude benzol or commercial benzol containing sulphur all of which substances are hereinafter understood to be comprised in the term "crude benzol", is advantageously combined in one operation with the destructive hydrogenation under pressure of other carbonaceous materials, such as coal, hydrocarbons or their derivatives and the like. By the expression "total crude benzol" are understood the products obtained by scrubbing coal gas or coke oven gas coming from the retorts, with wash oil, and separating the absorbed product therefrom by distillation, if desired with steam. The product so obtained boiling up to about 200° C. is the so-called total crude benzol of which crude benzol is a fraction.

For example by treating a mixture of a middle oil and benzol containing sulphur with hydrogen under pressure in a high pressure tube in the presence of a catalyst which on the one hand is immune against poisoning by sulphur and on the other hand promotes the destructive hydrogenation of the middle oil, benzine is obtained from the middle oil and the benzol is simultaneously desulphurized and thus a motor fuel is obtained which is non-knocking and which fulfills all the requirements as regards freedom from sulphur.

Catalysts comprising a metal of the sixth group of the periodic system as such or in the form of their compounds or compounds of cobalt are particularly suitable for application in the process according to the present invention. The process may also be carried out by extracting coal, shale and the like with benzol containing sulphur and then subjecting the liquid products to a destructive hydrogenation without separation of the extracting agent. The destructive hydrogenation product can either be employed directly as a motor fuel which does not knock and which is to a great extent free from sulphur or the desulphurized benzol can be distilled off. Moreover, the oils contained in the residues from the destructive hydrogenation of carbonaceous substances such as various kinds of coal and the like may be worked up with the aid of benzol containing sulphur and then the benzol together with the oil extracted can be subjected to destructive hydrogenation. In another method of carrying out the process in accordance with the present invention benzol containing sulphur can be added to the coal itself, in particular brown coal, which is to be hydrogenated. The quantity of benzol to be employed depends on the desired nature of the fuel to be produced.

The great advantage of the process in accordance with the presence invention is the very economic conversion of benzol of very little value into a very valuable product. The reaction is preferably carried out at between about 380° and 550° C. although higher or lower temperatures may in most cases be employed. The pressures employed may be rather low in the case of very active catalysts, for example, 5, 10 or 20 atmospheres, but are preferably higher. Thus pressures of 50, 100, 200, 300, 1000, 3000, 5000 atmospheres or even more prove very advantageous. Operation in vertical reaction vessels, namely towers, is one of the methods according to which our reaction may be carried out.

The following example will further illustrate the nature of the said invention, but the invention is not restricted to this example. The parts are by weight.

*Example*

A mixture of 3 parts of middle oil obtained by destructive hydrogenation of Mid-German brown coal and 2 parts of benzol containing sulphur is passed together with hydrogen at 460° centigrade and at 200 atmospheres pressure over a catalyst prepared from molybdic acid, zinc oxide, magnesia and chromic acid. The product obtained contains 60 per cent of constituents which boil up to 185° centigrade and has a sulphur content of less than 0.02 per cent. It is an excellent non-knocking motor fuel.

What we claim is:—

1. In desulphurizing crude benzol by treatment with a gas comprising hydrogen at elevated temperature and under pressure, the step of mixing a middle oil with crude benzol containing sulphur and subjecting the mixture to a treatment with a gas comprising hydrogen under pressure and at a temperature of between about 380° C. and 550° C. in the presence of a catalyst immune from poisoning by sulphur.

2. In desulphurizing crude benzol by treatment with a gas comprising hydrogen at elevated temperature and under pressure, the step of mixing the said benzol containing sulphur with middle oil obtained by the destructive hydrogenation of brown coal and passing it together with hydrogen at a temperature of between about 380° and 550° C. and under elevated pressure over a catalyst comprising a metal of the sixth group of the periodic system.

3. In desulphurizing crude benzol by treatment with a gas comprising hydrogen at elevated temperature and under pressure, the step of mixing the said benzol containing sulphur with middle oil obtained by the destructive hydrogenation of brown coal and passing it together with hydrogen at a temperature of about 460° C. and under a pressure of about 200 atmospheres over a catalyst prepared from molybdic acid, zinc oxide, magnesia and chromic acid.

4. In desulphurizing crude benzol by treatment with a gas comprising hydrogen at elevated temperature and under pressure, the step of mixing a hydrocarbon material selected from the class consisting of liquid and solid hydrocarbons different from crude benzol and capable of being destructively hydrogenated under the conditions of working with the said benzol and subjecting the mixture to a treatment with a gas comprising hydrogen under pressure and at a temperature between about 380° and 550° C. in the presence of a catalyst immune to poisoning by sulphur.

MATHIAS PIER.
WALTER SIMON.